May 8, 1956  A. B. BOYD  2,744,262
VALVE OPERATING MECHANISM
Filed May 27, 1953  3 Sheets-Sheet 2
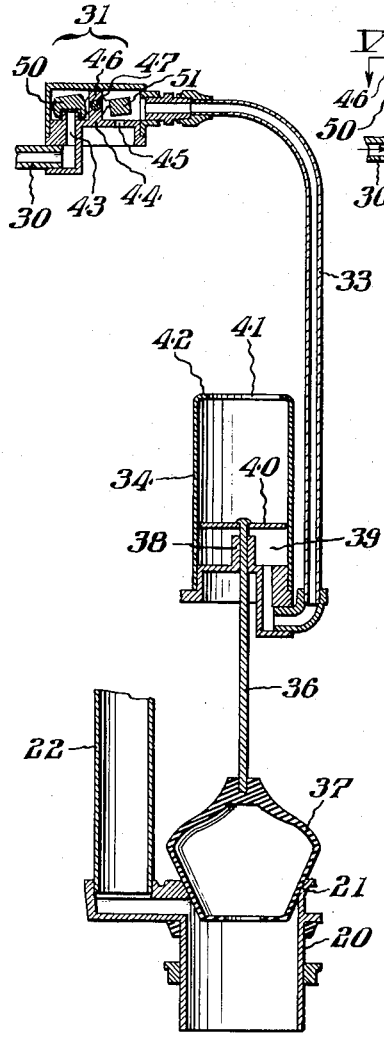
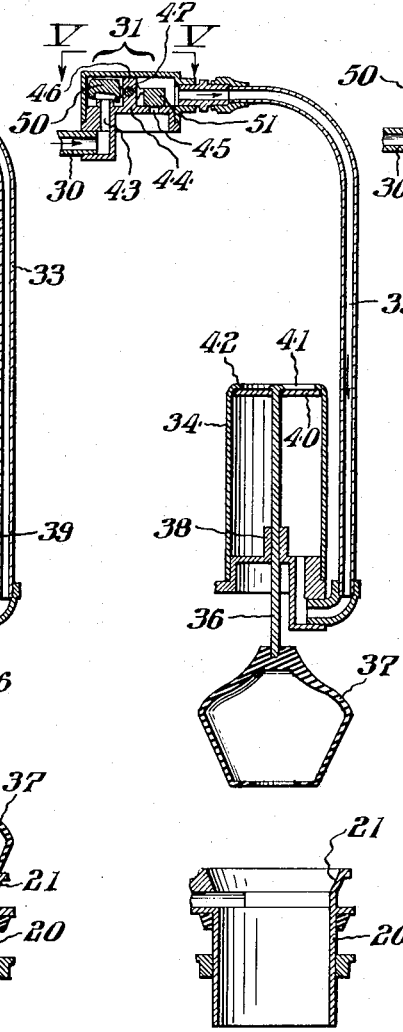
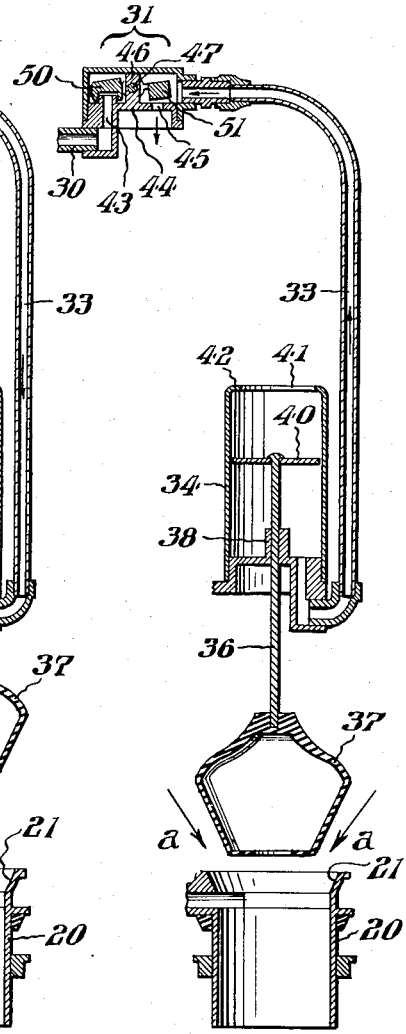
INVENTOR.
Albert B. Boyd,
BY Paul & Paul
ATTORNEYS May 8, 1956 A. B. BOYD 2,744,262
VALVE OPERATING MECHANISM
Filed May 27, 1953 3 Sheets-Sheet 3
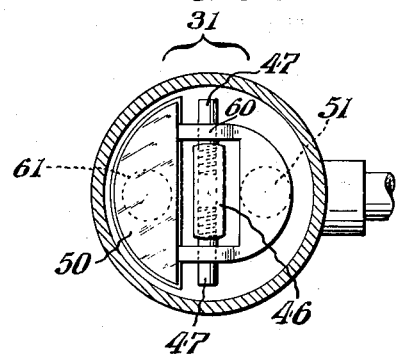
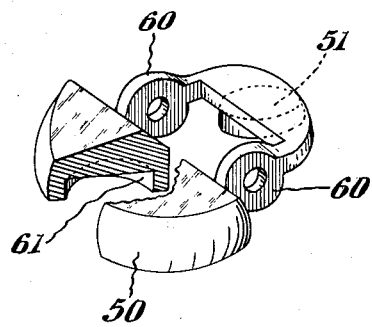
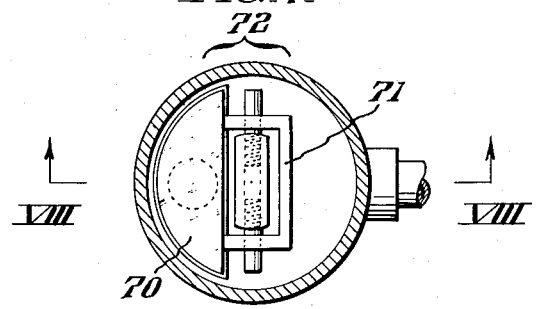
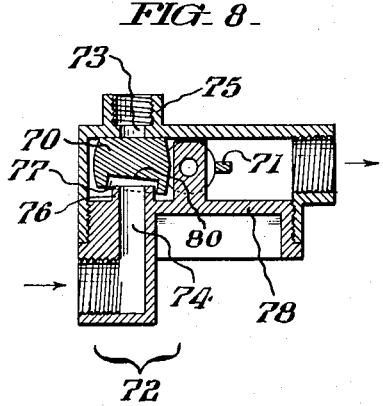
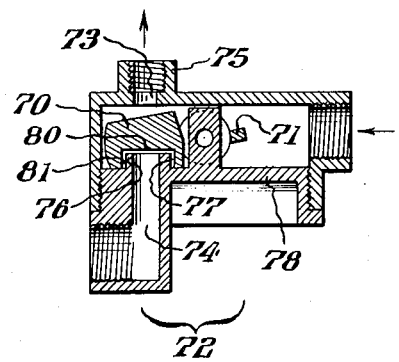
INVENTOR.
Albert B. Boyd,
BY Paul & Paul
ATTORNEYS.

United States Patent Office 2,744,262
Patented May 8, 1956

2,744,262

VALVE OPERATING MECHANISM

Albert B. Boyd, Drexel Hill, Pa.; Margaretta Boyd Ritter, administratrix of said Albert B. Boyd, deceased Application May 27, 1953, Serial No. 357,801

5 Claims. (Cl. 4—67)

This invention relates to a valve operating mechanism and more specifically concerns an apparatus for the operation of a flush valve mechanism such as a flush valve for a water closet and the like.

This application is a continuation-in-part of my co-pending application Serial No. 184,988, filed September 15, 1950, now United States Patent No. 2,644,952, granted July 14, 1953.

Conventional automatic flush valves usually include a ball float and a pull rod therefor, the pull rod being guided for reciprocating movement up and down and operated through a mechanical linkage from a handle located outside the tank. Such devices, while measurably satisfactory, are noisy and inefficient by reason of loose connections which develop in the mechanical linkages after extended periods of operation. Moreover such devices are inefficient by reason of the swinging of the ball float which sometimes causes imperfect seating of the valve. As a result much wastage of water takes place until the valve is reseated, which operation is tedious and annoying.

It is accordingly one object of this invention to provide a valve operating mechanism for overcoming the foregoing disadvantages in a simple and practical manner, with positive and dependable action. It is another object of this invention to provide a flush valve operating mechanism of this character which substantially eliminates the noise incidental to the flushing operation.

In some localities specifications are in effect requiring the provision of backflow preventers or vacuum breaking devices for preventing the water in the flush tank from flowing back into the water supply system. Such vacuum breaking devices are ordinarily attached to piping or fixtures within the tank and are vented to the air space above the water in the tank. This vacuum breaking apparatus represents additional cost not only for the vacuum breaking apparatus but also for its separate installation.

Accordingly another object of this invention is to provide a valve operating mechanism which prevents such backflow without interfering with the other advantages heretofore discussed.

The foregoing and other objects and advantages of the invention, including the simplicity and economy of the same, and the ease with which it may be incorporated as an attachment into existing flush valve devices, will further become apparent hereinafter and in the drawings whereof:

Figs. 2–4 represent views in vertical section of the valve operating mechanism shown in Fig. 1, illustrating the manner in which the mechanism operates;

Fig. 5 represents a plan view of a rocker valve comprising one component of the valve operating mechanism, taken as indicated by the lines and arrows V—V which appear in Fig. 3 with the housing member in section;

Fig. 6 represents a view in perspective of the rocker valve with a portion broken away and shown in section in order more clearly to illustrate important details;

Fig. 7 represents a plan view similar to Fig. 5 showing a modified rocker valve mechanism;

Fig. 8 represents a sectional view taken as indicated by the lines and arrows VIII—VIII which appear in Fig. 7; and Fig. 9 represents a sectional view similar to Fig. 8 showing the operation of the modified rocker valve mechanism.

Figure 1:
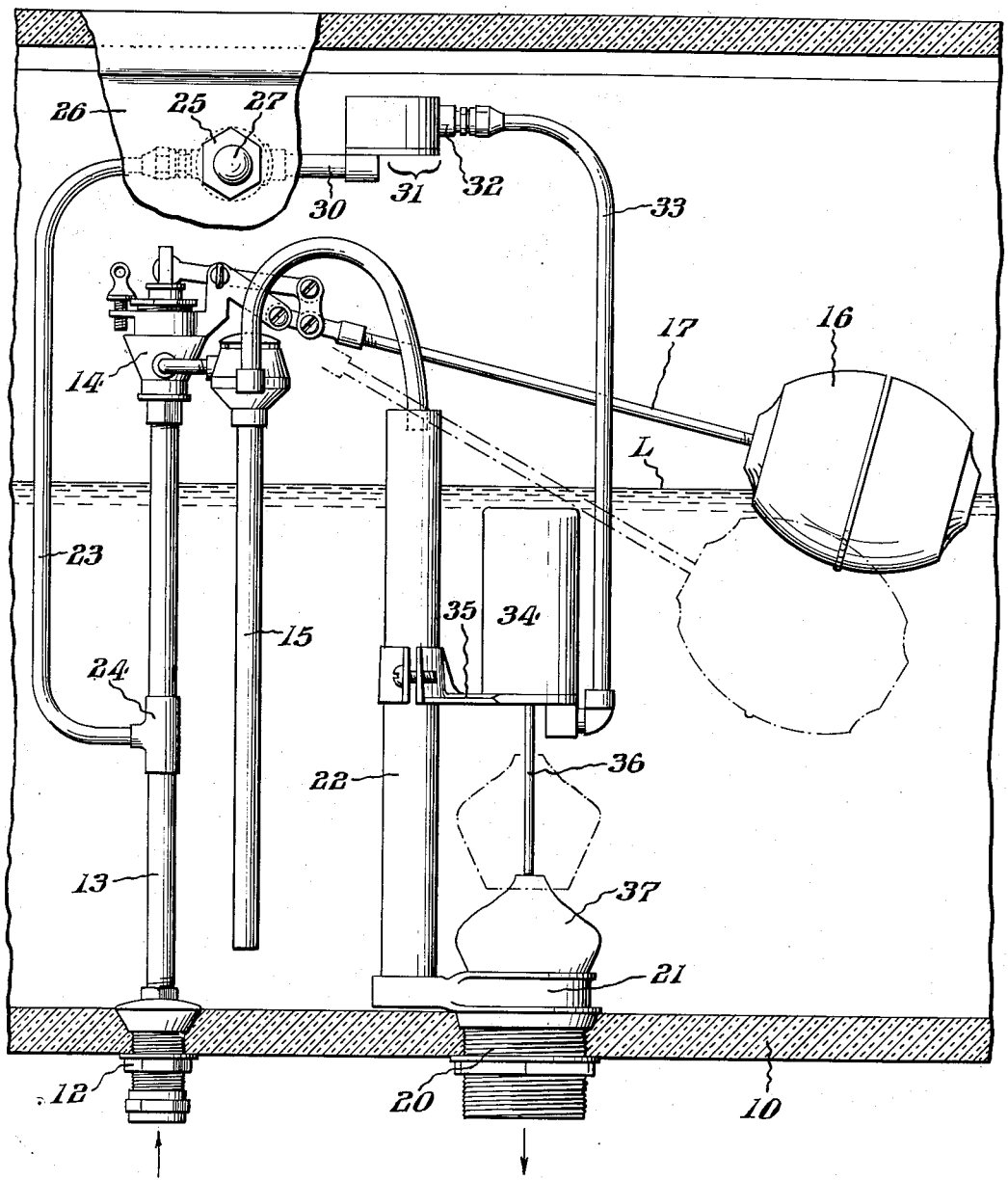
Fig. 1 represents a side elevation of a flush tank containing a valve operating mechanism constructed in accordance with this invention, the forward wall of the tank being broken away in order to disclose important details.

In describing the specific embodiments of my invention selected for illustration in the drawings, specific terms will be employed for the sake of clarity, but it is to be understood that the scope of the invention is not intended to be limited thereby.

Turning now to Fig 1 of the drawings, the number 10 designates a tank or water closet containing water at the level L. Pipe fittings 12 which extend vertically through the bottom of tank 10 are fitted to a water inlet pipe 13 which communicates through an inlet valve 14 to a tube 15 through which the tank 10 is filled. The liquid level in the tank is controlled by means of a conventional ball float 16 which is connected by rod 17 to the inlet valve 14.

Through another opening in the bottom of tank 10 extends a flush valve fitting 20 connected to a flush valve seat member 21. Extending upwardly from the seat member 21 is an overflow pipe 22 the top of which extends above the liquid level.

The number 23 designates a water inlet pipe connected by a T 24 to the pipe 13 ahead of the inlet valve 14. The water inlet pipe 23 is connected to a push button valve 25 which extends through the front wall 26 of tank 10. The push button valve 25 is preferably of the conventional self-closing type. It may be opened by finger pressure exerted on the knob 27. Upon release of such finger pressure the valve is automatically closed by a spring or other well known device. Such self-closing valves are well known in the art and are not further described herein.

A pipe 30 is connected to the outlet of valve 25 and is connected to an inlet opening (further to be described) in the rocker valve housing comprehensively designated by the number 31. The housing 31 has an outlet pipe 32 to which is connected a pipe 33 which extends downwardly below the water level L and is connected to the bottom of a cylinder 34. The cylinder 34 is mounted on pipe 22 under the water level by means of a bracket 35. Extending downwardly from the cylinder 34 is a pull rod 36 which is fixed to a ball valve 37 which is adapted to be seated in the seat member 21.

Turning to Figs. 2–4 of the drawings it will be appreciated that the pull rod 36 is guided by an apertured boss 38 on the closure base threaded to cylinder 34. Pull rod 36 is fixed at its upper end to a piston 40 which has capacity to reciprocate up and down in the cylinder 34. Boss 38 maintains piston 40 above the floor of the cylinder providing an intermediate chamber 39 for pressure distribution. Cylinder 34 has an opening 41 at its top and is rolled inwardly to provide a stop 42 for limiting the upward movement of the piston 40. The reciprocating motion of piston 40 is lubricated and substantially silenced by the water in the tank which is preferably above the open top of cylinder 34.

It will be observed that the water inlet pipe 30 is connected to an inlet opening 43 in the bottom plate 44 of the rocker valve housing 31. The plate 44 also has a relief opening 45. Extending upwardly from the bottom plate 44 is a post 46 through which a transverse pivot pin 47 extends. Pivotally mounted on the pin 47 is a rocker valve the details of which will be more fully described hereinafter. Such valve includes a weighted valve member 50 and a relatively light weight valve member 51 located on opposite sides of the pivot 47. Weighted member 50 is in registry with the inlet opening 43 while the relatively light weight valve member 51 is in registry with the relief opening 45. The members 50, 51 swing up and down toward and from the associated openings, one such valve member being up when the other is down.

It will accordingly be appreciated that, with the flush valve operating system in condition for operation, the weighted member 50 overbalances the relatively light weight member 51 and is seated closing the inlet opening 43 while the relatively light weight member 51 is maintained above the relief opening 45 which is accordingly open. To operate the mechanism the knob 27 is actuated, thereby opening the valve 25. The pressure of the incoming water through the inlet opening 43 immediately swings the rocker valve device, lifting the weighted valve member 50 from its seat and immediately closing the relief opening 45. Thus the flow of water pressure is transmitted through the pipe 33 to the under face of piston 40. The pull rod 36 is immediately lifted by hydraulic pressure, reaching the position illustrated in Fig. 3 of the drawings and thereby lifting the ball valve 37 from its seat 21. The water content of the tank 10 is thereby drained through the fitting 20.

When the operator releases the finger pressure on knob 27, valve 25 automatically closes thereby disconnecting the water supply from inlet opening 43. The rocker valve mechanism then assumes the position shown in Fig. 4; by reason of the overbalancing weight of the heavy valve member 50 the inlet opening 43 is closed and the relief opening 45 is simultaneously opened. The water contained in the cylinder 34 below the piston 40 flows up through pipe 33 and drains out through the relief opening 45. Although the opening 45 may be located a substantial distance above the cylinder 34, the water is pumped out of the cylinder 34 by the combined weight of the piston 40, pull rod 36 and ball valve 37. Any other suitable means may be provided for urging the piston 40 downwardly to overcome the slight head of water in pipe 33. However, the rush of water downwardly past the ball valve 37 into the fitting 20, as indicated by the arrows a—a which appear in Fig. 4, aided materially by functioning of the hollow ball valve with a suction action as it approaches and enters valve seat 21, provides a substantial downward drag upon the ball valve 37 which is sufficient of itself to cause a prompt removal of water through the pipe 33 and relief opening 45. Accordingly the lift of ball 37 away from its seat is preferably limited to the extent that the lifted ball 37 is adjacent the seat 21 as shown in Figs. 1, 3 and 4, in the path of the water flowing downwardly into the fitting 20.

Pipe 33 remains substantially full of water until the next time the device is actuated, thus providing quick pressure response to the water flowing from the rocker valve mechanism. However, if desired, slow leakage may be provided between pull rod 36 and sleeve 38 thereby draining the upper portion of pipe 33 during an extended period of non-use.

From Figs. 1-4 it will be appreciated that the water cannot siphon back from the tank 10 through pipe 33 into the inlet pipe 13, even if the pressure in pipe 13 is reduced or entirely cut off. The rocker valve mechanism is vented through the opening 45, breaking the water leg needed for a siphoning action. Relief opening 45 is open at all times except when the rocker valve is actuated by the pressure in the pipe line 13, under which condition no such siphoning could occur.

Turning to Fig. 5, the housing 31 is preferably cylindrical in shape, with pivot pins 47 contained within the housing. The weighted valve member 50 and the light weight valve member 51 are preferably of curved outline corresponding to the curvature of the housing 31. The post 46 is centrally located, with the pins 47 respectively extending from both its ends. The valve members are fixed on two rigid arms 60 which are provided with bearings which are pivoted on opposite ends of pin 47.

Formed on the bottom of weighted valve member 50 is a cylindrical recess 61 (Fig. 6) which is an important feature of the invention, as will further appear.

The apparatus shown in Figs. 7–9 is comparable to the rocker valve mechanism just described. It will be observed that a weighted valve member 70 is pivoted as heretofore described. On the opposite side of the pivot is a cross brace 71. The top of housing 72 is provided with a relief opening 73, while the inlet opening 74 is constructed and located as previously described. An internally threaded tube 75 extends upwardly from relief opening 73. The floor 78 of the housing is threaded to its walls.

The operation of the device shown in Figs. 7–9 is substantially as heretofore described. When the incoming fluid pressure raises valve member 70 it causes relief opening 73 to close. When the pressure in inlet opening 77 is cut off, valve member 70 seats itself by gravity concurrently opening the vent 73. Preferably a bent pipe (not shown) is threaded into tube 75 to direct the water from cylinder 34 downwardly into the tank, to eliminate splashing. The open end of the pipe must be above the water level in the tank.

The inlet pipe 74 has an upwardly extending cylindrical portion 76 forming an inlet valve seat. Seat 76 fits within the cylindrical opening 77 when the weighted valve member 70 is down, as appears in Fig. 9. This is an advantageous feature causing quicker, more positive raising and opening of the weighted valve member 70 when the device is operated. The pressure of the incoming water first lifts the valve slightly. The water flows upwardly against the valve face 80, then downwardly through the annular space 81 between tube 76 and valve member 70. This creates reactive forces which materially accelerate the valve opening action and the closing of relief opening 73 as well. The operation of the device is also rendered more positive.

It will be appreciated that the elevated valve seat and recessed coacting valve member just described are also shown, in somewhat less detail, in Figs. 2–4, and that this combination has utility in self closing valves generally.

It will be appreciated that the valve operating mechanism 31 may be located at any convenient place inside or outside the tank 10, above or below the water level, provided it is operatively connected into the water supply line and to the cylinder 34. When the mechanism 31 is disposed below the water level the relief opening 45 is preferably vented, by means of tubing or the like, to the air above the water level. Such tubing preferably has a downwardly directed turn above the water level facilitating the return of water from cylinder 34 and pipe 33 to tank 10.

Although the valve operating mechanism of this invention has been described in detail with reference to specific embodiments adapted for a particular purpose, it will readily be apparent that the device has other uses, that the form of the edvice may be considerably varied, and that equivalent structures and materials may be employed for accomplishing the same results. Such changes, including reversals of parts and the use of certain features of the invention independently of other features, are within the spirit and scope of the invention as defined in the appended claims.

Having thus described my invention, I claim:

1. In a tank containing water and air above said water, and having a flush valve disposed below the water level, a combined valve operating and vacuum breaking mechanism comprising reciprocating means for operating the valve, a hydraulic cylinder for operating the reciprocating means to open the flush valve, a liquid supply line, control means for opening and closing said liquid supply line, an overbalanced rocker valve, located wholly above said water level, said rocker valve comprising a container having an inlet opening connected to said control means, said container having an outlet opening connected to said hydraulic cylinder, and said container having a relief opening therein and having an overbalanced valve normally closing the inlet opening with the relief opening open, said overbalanced valve including an actuator member responsive to incoming fluid flow to open the inlet opening and close the relief opening causing actuation of said hydraulic cylinder thereby opening said flush valve.

2. A flush valve operating device comprising a container having a vent therein, a closure for the container below the vent, means for connecting a pressure fluid supply to said container, piston means in said container reciprocable toward and from said closure, means connecting said piston means to operate the flush valve, a rocker valve mechanism connected to said container, said mechanism including an inlet opening, an outlet opening and a relief opening for the fluid, said mechanism including a rocker element normally closing said fluid inlet with the relief orifice open, said rocker element including an actuator element responsive to fluid entering said inlet to close the relief orifice causing the fluid to actuate the piston.

3. In a tank containing water and air above the water and having means for maintaining said water at a predetermined level, the combination comprising a flush valve operating and vacuum breaking apparatus which is operable from a source of water under pressure comprising reciprocating means in the tank below said water level for operating the flush valve, hydraulic means connected to said reciprocating means for operating said reciprocating means to open the flush valve, water carrying means connected to said hydraulic means, combined hydraulic actuator and vacuum breaker container connected into said water carrying means, said container having an inlet opening, an outlet opening and a relief opening, which relief opening is vented above said water level, a water supply line connecting said inlet opening to said water under pressure, and said outlet opening being connected to said water carrying means, a self-closing manually openable valve in said water supply line, valve means in said container effective to close the relief opening in response to water pressure at the inlet opening, whereby the opening of the manually openable valve causes the actuation of said hydraulic means thereby opening said flush valve, and means causing said valve means in said container to reopen said relief opening when said manually openable valve is closed, said relief opening being in fluid communication with said outlet opening when said relief opening is open, thereby breaking vacuum and preventing siphoning of the water from said tank through said water carrying means through said inlet opening back to said source, but permitting the water to flow back from said hydraulic means through said water carrying means and out said relief opening.

4. A flush valve operating device comprising a container having a vent therein, a closure for the container below the vent, means for connecting a pressure fluid supply to said container, piston means in said container reciprocable toward and from said closure, means connecting said piston means to operate the flush valve, a normally closed, self-closing valve mechanism connected to said container, said valve mechanism including an inlet opening, an outlet opening and a relief opening for the fluid, said valve mechanism including a closure element normally closing said inlet opening with the relief orifice open, feed means connecting water under pressure into said inlet opening, flow controlling means in said feed means, said closure element including an actuator element which is positioned to be responsive to fluid entering said inlet opening to close the relief orifice, causing the fluid to actuate the piston.

5. In a tank containing water and air above said water, and having means for maintaining said water at a predetermined level in said tank, the combination for operating a flush valve disposed below the water level, said combination comprising a combined valve operating and vacuum breaking mechanism including reciprocating means connected for operating the valve, a hydraulic cylinder connected for operating the reciprocating means to open and close the flush valve, a liquid supply line connected to the hydraulic cylinder, a normally closed and self-closing valve mechanism connected in the supply line and located wholly above said water level, said valve mechanism comprising a container having an inlet opening, an outlet opening and a relief opening therein and having a valve normally closing the inlet opening with the relief opening open, and manually controllable means for introducing water under pressure into said inlet opening, said valve including an actuator member located and arranged for response to incoming water flow to open the inlet opening and to close the relief opening, causing actuation of said hydraulic cylinder thereby opening said flush valve.

References Cited in the file of this patent

UNITED STATES PATENTS

| | | |
|---|---|---|
| 2,044,921 | Swanland | June 23, 1936 |
| 2,341,116 | Owens | Feb. 8, 1944 |
| 2,534,524 | Molloy | Dec. 19, 1950 |
| 2,563,200 | Venning | Aug. 7, 1951 |
| 2,587,901 | Robinson | Mar. 4, 1952 |
| 2,644,952 | Boyd | July 14, 1953 |

FOREIGN PATENTS

| | | |
|---|---|---|
| 447,056 | Great Britain | May 6, 1936 |